United States Patent [19]

Gattner et al.

[11] 4,116,923

[45] Sep. 26, 1978

[54] DYED POLYESTERS, PROCESS FOR THEIR PREPARATION AND THEIR USE FOR THE DYEING OF PLASTICS

[75] Inventors: Hans Gattner, Bad Nenndorf; Ernst Spietschka, Oberauroff; Helmut Tröster, Königstein, Taunus, all of Fed. Rep. of Germany

[73] Assignee: Hoechst Aktiengesellschaft, Frankfurt am Main, Fed. Rep. of Germany

[21] Appl. No.: 782,163

[22] Filed: Mar. 28, 1977

[30] Foreign Application Priority Data

Mar. 20, 1976 [DE] Fed. Rep. of Germany ...... 2613493

[51] Int. Cl.$^2$ .................... C08L 67/00; C08G 63/12
[52] U.S. Cl. .................... 528/220; 260/873; 260/40 R; 528/292; 528/295; 528/298; 528/289
[58] Field of Search .............. 260/40 R, 873, 75 N, 260/75 S, 75 R

[56] References Cited

U.S. PATENT DOCUMENTS

| | | | |
|---|---|---|---|
| 3,520,950 | 7/1970 | Kramm | 260/75 N X |
| 3,644,270 | 2/1972 | Valiaveedan | 260/40 R |
| 3,652,719 | 3/1972 | Cleary | 260/873 |
| 3,769,229 | 10/1973 | Noetzel | 260/40 R X |
| 3,845,075 | 10/1974 | Fuchs et al. | 260/40 R X |
| 3,918,976 | 11/1975 | Arai et al. | 260/40 R X |
| 3,923,726 | 12/1975 | Benz | 260/40 R |

*Primary Examiner*—Lucille M. Phynes
*Attorney, Agent, or Firm*—Curtis, Morris & Safford

[57] ABSTRACT

When reacting a dyestuff having hydroxy, acyloxy, carboxy or carbalkoxy groups with a polyester derived from terephthalic and/or isophthalic acid and, per mol of dicarboxylic acid, about 0.75 to 1.5 mol of a low-molecular alkanetriol with primary alcohol groups (methylol groups) or, instead of said polyester, with the corresponding starting materials or precondensates, a polyester with chemically linked dyestuff units is obtained which is useful for dyeing plastics, especially polyolefins. The dyed plastic materials are heat resistant, even when containing fluorescent dyestuff units, transparent and uniformly dyed.

15 Claims, No Drawings

DYED POLYESTERS, PROCESS FOR THEIR PREPARATION AND THEIR USE FOR THE DYEING OF PLASTICS

It is already known that dyestuffs having reactive groups, for example carboxylic acid and carboxylic acid ester groups can be incorporated into plastics by condensation (cf. German Offenlegungschrift No. 2,038,410). It is further known that colorants can be finely distributed in polyesters and that these dyed polyesters are suitable for the dyeing of plastics (cf. German Offenlegungsschriften Nos. 2,219,068 and 2,452,870).

It has now been found that especially advantageous colored polyesters consisting essentially of recurring units of terephthalic acid and/or isophthalic acid and, per mole of dicarboxylic acid, of about 0.75 to about 1.5 mol of a low-molecular alkanetriol with primary alcohol groups (methylol groups) and containing of from 0.1 to 25% by weight of recurring units of the formula

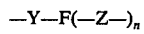

wherein F represents identical or different dyestuff radicals, Y and Z are identical or different radicals of the formula

$n$ is zero, 1 or 2, are obtained by condensing identical or different substances of the formula

wherein F is defined as above, G represents equal or different radicals of the formulae

wherein Ac represents lower alkanoyl or benzoyl and R' is lower alkyl or lower hydroxyalkyl and $m$ is an integer of from 1 to 3, with the corresponding polyesters, the starting materials or the precondensates thereof. The so obtained dyed polyesters are excellently suitable for dyeing plastics.

Substantially uniform cocondensates of dyestuff and polyester having a softening point in the range of from 45° to 160° C are obtained according to this invention.

The novel polyesters are prepared in known manner. Polyesters which have no unesterified carboxy groups are used preferably to attain an optimum temperature stability, transparence, and dispersibility in plastics, especially in polyolefins, and a tendency to migration and exudation of as low as possible simultaneously with an insolubility in polyolefins. Therefore lower alkyl esters, for example β-hydroxy-ethyl, preferably methyl and ethyl esters, are used as monomers for introducing the dicarboxylic acid units. Esters of further di- or polycarboxylic acids may be used simultaneously in lower amounts, as far as they are stable at the preparation and processing temperatures and if they are capable of being readily transesterified under the reaction conditions.

Suitable low-molecular alkanetriols are trimethylol ethane and/or trimethylol propane. Further hydroxy compounds may be added, if a modification of the properties of the resulting polyester, for example of the softening point and elasticity, is intended. Polyhydroxy compounds which have a tendency to discolor or caramelize at higher temperatures, for example glycerol or pentaerythritol, are unsuitable.

Per mol of dicarboxylic acid ester, from 0.75 to 1.5, preferably from 1.2 to 1.5, mol of triol are reacted. The transesterification is suitably carried out in an inert gas atmosphere of nitrogen or carbon dioxide in the presence of the conventional catalysts, for example zinc, manganese(II) and lithium acetate.

It is also possible to transesterify high molecular polyesters in the presence of the triols and of the dyestuffs to be incorporated or to use adequate precondensates.

Suitable dyestuffs of the formula F (G)$_m$ are in principle any organic dyestuffs which are sufficiently thermostable, for example azo, anthraquinone, benzanthrone, quinophthalone, methine, acridine, perinone, cumarin, xanthene, oxazine, perylene, benzoxanthene and benzothioxanthene dyestuffs. The dyestuffs can be used alone or as mixtures.

Especially preferred are dyestuffs of the formula

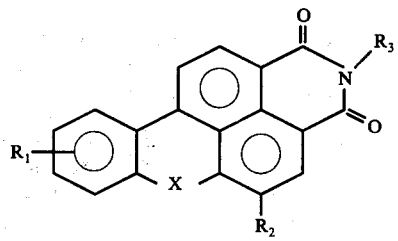

wherein $R_1$ is hydrogen, lower alkyl, lower alkoxy, lower carbalkoxy or halogen, especially chlorine or bromine, $R_2$ is hydrogen or lower alkoxy, $R_3$ is lower carbalkoxyalkyl, lower alkanoyloxy, lower hydroxyalkyl, lower mono- or dicarbalkoxyphenyl or hydroxy and X is oxygen or sulfur.

The term "lower" in connection with alkyl and alkoxy groups means groups having 1 to 6, preferably 1 to 4, carbon atoms.

A special advantage of the present invention resides in the fact that even soluble, frequently especially cheap dyestuffs, which could not be used hitherto for the dyeing of plastics, especially of polyolefins, because of their unsatisfactory fastness to migration, are now appropriate.

The polyesters according to the invention can be easily crushed with the conventional apparatuses. Frequently a grinding is not required, however, since the novel products can also be processed in coarse form. The novel polyesters can be dispersed in the molten plastics without difficulty with the conventional apparatuses. Thus, homogenous dyeings of high tinctorial strength and of excellent fastness to migration are obtained.

The temperature stability of the plastics dyeings obtained with the polyesters according to this invention is excellent, even at processing temperatures of more than 300° C. This property becomes especially evident when using fluorescent dyestuffs, which can be incorporated and which are known to be especially sensitive to a discoloration of the supporting resin. A diminution of the fluorescence is not observed for the polyesters according to the invention, even at such high temperatures.

The following examples illustrate the invention.

In the examples the temperatures are given in ° C, AN means acid number, OHN means hydroxy number.

The triols used in the examples are 1,1,1-trimethylol ethane and 1,1,1-trimethylol propane.

EXAMPLE 1

In a glass flask provided with a stirrer, a thermometer, a descending condenser and a gas introduction tube there are placed
97 g (0.5 mol) of terephthalic acid dimethyl ester,
90 g (0.75 mol) of trimethylol ethane
1.6 g of the dyestuff of the formula

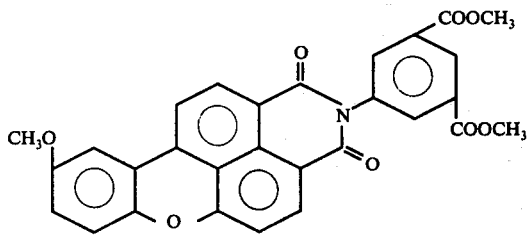

and the mixture rendered 30 mg of manganese(II) acetate and molten in a nitrogen atmosphere at a temperature of the heating bath of about 200° C. The inner temperature is maintained while stirring at about 200° C for about 1 hour, increased to 225° C for 1 hour and for a further hour to about 235° C. 23 ml of distillate are formed during this period.

For removing the residual monomers heating is continued for about 30 minutes at a bath temperature of 250° C while stirring in a water-jet vacuum.

The product obtained is a greenish-yellow fluorescent brittle polyester resin having a melting point of from 90° to 92° C which after coarse crushing is suitable for dyeing polyolefins brilliant greenish-yellow shades of high fastness to migration.

EXAMPLE 2

When operating as in Example 1, but using the equivalent quantity (100.5 g) of trimethylol propane instead of trimethylol ethane, and 3.2 g of the dyestuff of the formula

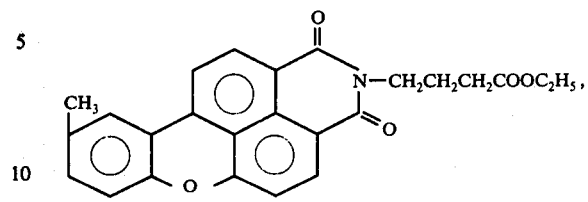

instead of said dyestuff,
a greenish-yellow fluorescent dyestuff condensation product is obtained, which has a melting point of from 55° to 60° C. The AN is zero, and the OHN is 416.

EXAMPLE 3

145.5 g (0.75 mol) of dimethyl terephthalate,
126.0 g (0.94 mol) of trimethylol propane and
4 g of the dyestuff of the formula

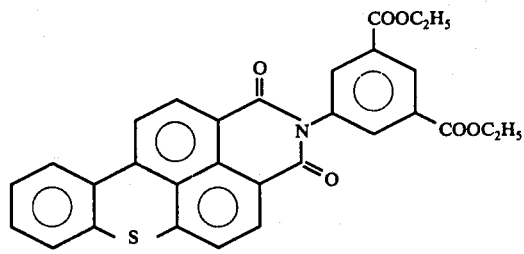

are condensed to give a brilliant yellow polyester, resin (melting point of from 85° to 87° C) in the manner indicated in Example 1. Said resin can be used as indicated for the dyeing of polyolefins.

The following table shows further dyestuffs which can be incorporated by condensation into polyesters. From the dyed polyesters colored condensation products having similar properties can be obtained according to the aforesaid procedures:

| Example | Dyestuff | Shade |
|---|---|---|
| 4 | X = O; R$_1$ = OCH$_3$, R$_2$ = H; R = —CH$_2$COOH | greenish-yellow |
| 5 | X = O; R$_1$ = OCH$_3$, R$_2$ = H; R = —CH(COOH)(CH$_2$CH$_2$COOH) | " |
| 6 | X = O; R$_1$ = CH$_3$, R$_2$ = H, R = —C$_6$H$_3$(COOCH$_3$)$_2$ | " |

-continued

| Example | Dyestuff | Shade |
|---|---|---|

Common structure:

A naphthalimide with N–R substituent, bearing an aryl group (with R$_1$) connected via X, and R$_2$ on the naphthalene ring.

| Example | Substituents | Shade |
|---|---|---|
| 7 | X = O; R$_1$, R$_2$ = OCH$_3$; R = 3,5-bis(COOCH$_3$)phenyl | yellow |
| 8 | X = O; R$_1$ = H; R$_2$ = OCH$_3$; R = 3,5-bis(COOC$_2$H$_5$)phenyl | yellowish-green |
| 9 | X = S; R$_1$ = H; R$_2$ = OCH$_3$; R = 3,5-bis(COOCH$_3$)phenyl | orange-yellow |
| 10 | X = S; R$_1$ = Cl; R$_2$ = H; R = 3,5-bis(COOCH$_3$)phenyl | yellow |
| 11 | X = O; R$_1$ = OCH$_3$, R$_2$ = H; R = 3-COOCH$_3$-phenyl | yellowish-green |
| 12 | X = S; R$_1$ = H, R$_2$ = H; R = 3-COOCH$_3$-phenyl | yellow |
| 13 | X = O; R$_1$ = OCH$_3$, R$_2$ = H; R = —CH$_2$COOCH$_3$ | yellowish-green |
| 14 | X = O; R$_1$ = OCH$_3$, R$_2$ = H; R = —(CH$_2$)$_3$COOC$_4$H$_9$ | yellowish-green |
| 15 | benzimidazole-fused naphthalimide with COOCH$_3$ on benzimidazole phenyl and S-(2-COOCH$_3$-phenyl) on naphthalene + 3 isom. | yellow |

-continued
| Example | Dyestuff | Shade |
|---------|----------|-------|
| | 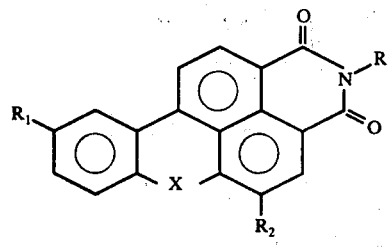 | |
| 16 | 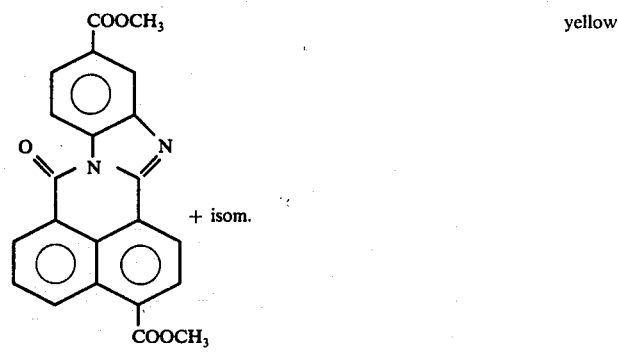 | yellow |
| 17 | 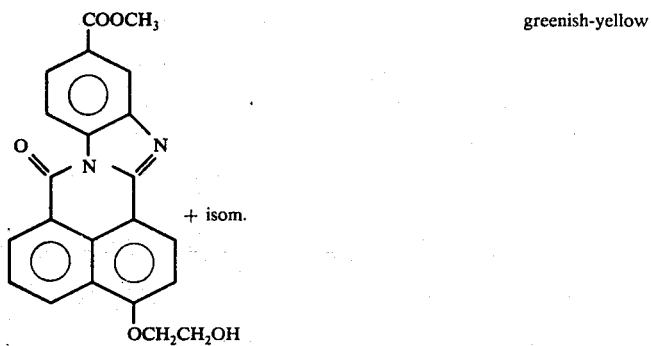 | greenish-yellow |
| 18 | 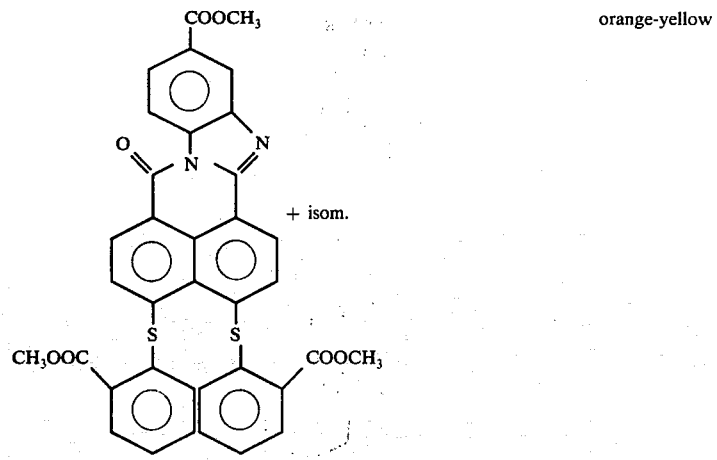 | orange-yellow |

-continued

| Example | Dyestuff | Shade |
|---|---|---|
| | (general structure with R, R₁, R₂, X substituents on naphthalimide-phenyl core) | |
| 19 | perylene-3,9-dicarboxylic acid bis(sec-butyl) ester derivative with COOCH(CH₃)CH₂CH₃ groups | yellowish-green fluorescent |
| 20 | perylene-3,4,9,10-tetracarboxylic diimide with N-(CH₂)₅COOC₂H₅ groups | orange |
| 21 | structure with CH₃OOC-phenyl linked via N=C and N to a second ring bearing COOCH₃, with C=O bridge | yellow |
| 22 | structure with CH₃OOC-phenyl linked via N= and N to naphthalene | orange |
| 23 | CH₃OOC-phenyl-indanone linked via =CH–C(OH)= and =N⁺H– to phenyl-COOCH₃, with O⁻ | yellow |

-continued
| Example | Dyestuff | Shade |
|---------|----------|-------|
| | 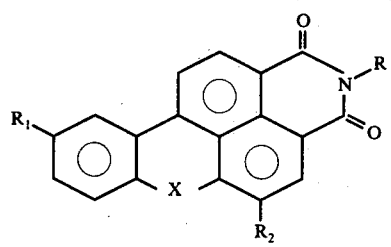 | |
| 24 | 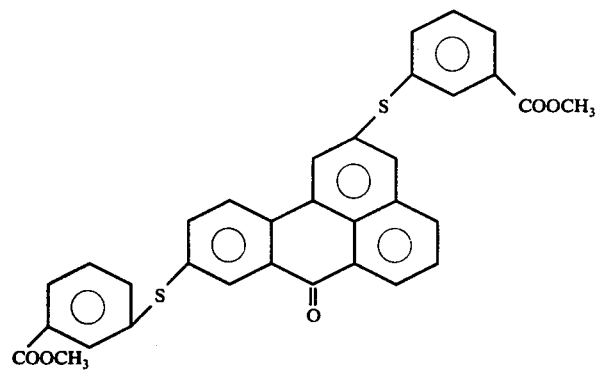 | yellow |
| 25 | 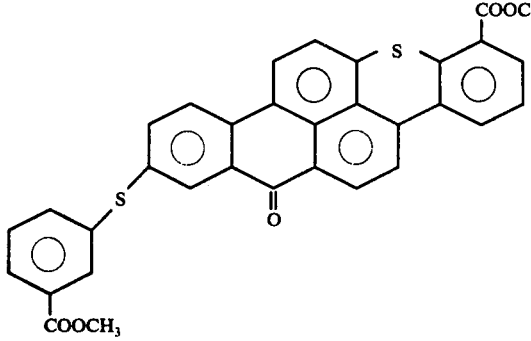 | red fluorescent |
| 26 | 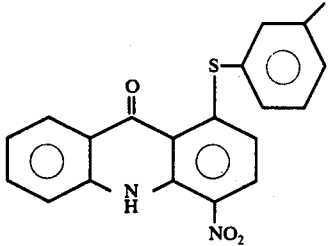 | yellow |
| 27 | 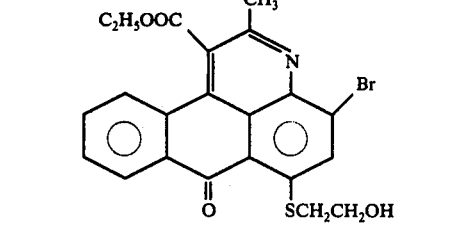 | yellow |
| 28 | 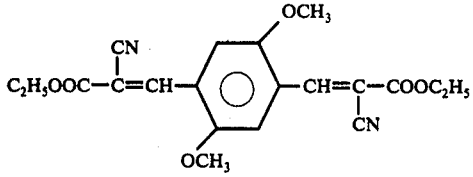 | orange-yellow |

-continued

| Example | Dyestuff | Shade |
|---|---|---|
| 29 | [structure with CH₃OCH₂CH₂ and C₂H₅OOCCH₂CH₂ amino groups on phenyl with CH=C(CN)(COOC₂H₅)] | greenish-yellow |
| 30 | [pyrazole-fused naphthalimide structure with COOC₂H₅, CH₂COOC₂H₅ and morpholino substituents] | reddish yellow |
| 31 | [1,4-diamino-2,3-bis(4-methoxycarbonylphenoxy)anthraquinone structure] | violet |
| 32 | [bis(phenyl)dichloro-dioxazine structure with C₆H₅COO and OCOC₆H₅ groups] | pink |
| 33 | [naphthalene bis-imide structure with COOCH₃ phenyl and CH₂COOCH₃ substituents] + isom. | yellow |

| Example | Dyestuff | Shade |
|---|---|---|
| 34 | 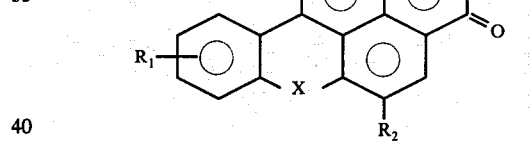 | yellow |
| | 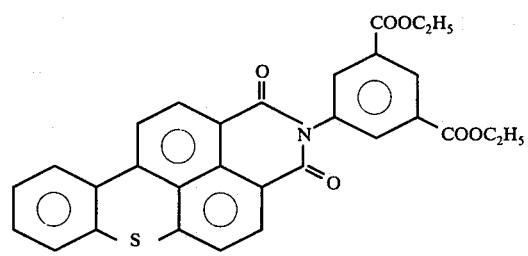 | |

We claim:

1. A polyester consisting essentially of recurring units of terephthalic acid, isophthalic acid or both of said acids and, per mol of said acid or acids, about 0.75 to 1.5 mol of a low-molecular weight trimethylol alkane, said polyester also containing 0.1 to 25% by weight of recurring units of the formula $$-Y-F(-Z-)_n$$

in which F is identical or different dyestuff radicals, Y and Z, which are identical or different, are —O—CO— or —CO—O— and $n$ is zero, 1 or 2.

2. A polyester as defined in claim 1, which contains per mol of said acid or acids 1.2 to 1.5 mol of trimethylol alkane, and which contains no free carboxy groups.

3. A polyester as defined in claim 1, wherein the trimethylol alkane is trimethylol ethane or trimethyl propane.

4. A polyester as defined in claim 3, wherein the trimethylol alkane is 1,1,1-trimethylol ethane, or 1,1,1-trimethylol propane.

5. A polyester as defined in claim 1, wherein F is the radical of a thermostable azo, anthraquinone, perinone, cumarin, xanthene, oxazine, perylene, benzanthrone, quinophthalone, methine, acridine, benzoxanthene or benzothioxanthene dyestuff.

6. A polyester as defined in claim 1, wherein F is the radical of a dyestuff of the formula

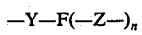

wherein $R_1$ is hydrogen, lower alkyl, lower alkoxy, lower carbalkoxy or halogen, $R_2$ is hydrogen or lower alkoxy $R_3$ is (lower carbalkoxy)-lower alkyl, carboxy-lower alkyl, dicarboxy-lower alkyl, lower alkanoyloxy, lower hydroxyalkyl, mono- or di-(lower carbalkoxy)-phenyl or hydroxy and X is oxygen or sulfur.

7. A polyester as defined in claim 6, wherein F is a radical of a dyestuff of the formula

8. A process for the preparation of a polyester as defined in claim 1, which comprises condensing a dyestuff or a mixture of dyestuffs of the formula $$F(G)_m$$

wherein F is a dyestuff radical, m is an integer of from 1 to 3 and G is identical or different groups of the formula —OH, —O—Ac, —COOH or —COOR wherein Ac is lower alkanoyl or benzoyl and R is lower alkyl or lower hydroxyalkyl, with a polyester consisting essentially of recurring units of terephthalic acid, isophthalic acid or both of said acids and, per mol of said acid or acids, about 0.75 to 1.5 mol of a low-molecular weight trimethylol alkane, or condensing said dyestuff with the starting materials for said polyester or a precondensate thereof.

9. A process as defined in claim 8, wherein the starting materials for said polyester are lower alkyl or lower hydroxyalkyl acids of said dicarboxylic esters.

10. A process as defined in claim 8, wherein the condensation is performed in an inert gas atmosphere.

11. A process as defined in claim 8, wherein the condensation is performed at a temperature of from 180° to 250° C.

12. A process as defined in claim 8, wherein per mol of said acid or acids, or the ester or esters thereof, 1.2 to 1.5 mol of said trimethylol alkane are reacted.

13. A process as defined in claim 8, wherein an acetate of zinc, manganese(II) or lithium is added as a transesterification catalyst.

14. A method for coloring a plastic at a temperature above 300° C, which comprises incorporating into said plastic a polyester as defined in claim 1.

15. A method as defined in claim 14, wherein said plastic is a polyolefin.

* * * * *

UNITED STATES PATENT AND TRADEMARK OFFICE
CERTIFICATE OF CORRECTION

PATENT NO. : 4,116,923

DATED : September 26, 1978

INVENTOR(S) : Gattner et al.

It is certified that error appears in the above-identified patent and that said Letters Patent are hereby corrected as shown below:

In the Heading, Item [30], after "Foreign Application Priority Data," the date "Mar. 20, 1976" should be --Mar. 30, 1976--.

Signed and Sealed this

Nineteenth Day of December 1978

[SEAL]

Attest:

RUTH C. MASON
Attesting Officer

DONALD W. BANNER
Commissioner of Patents and Trademarks